United States Patent [19]

Dickens et al.

[11] Patent Number: 5,483,833
[45] Date of Patent: Jan. 16, 1996

[54] METHOD AND APPARATUS FOR MONITORING AIRCRAFT COMPONENTS

[75] Inventors: Larry M. Dickens, Oak Ridge; Howard D. Haynes, Knoxville; Curtis W. Ayers, Clinton, all of Tenn.

[73] Assignee: Martin Marietta Energy Systems, Inc., Oak Ridge, Tenn.

[21] Appl. No.: 216,227

[22] Filed: Mar. 22, 1994

[51] Int. Cl.$^6$ .................................................. G01H 1/00
[52] U.S. Cl. ................................. 73/583; 73/865.9
[58] Field of Search .............................. 73/579, 583, 457, 73/462, 865.9, 2, 460, 459; 324/722

[56] References Cited

U.S. PATENT DOCUMENTS

| | | |
|---|---|---|
| 3,688,167 | 8/1972 | Ivey et al. . |
| 3,875,438 | 4/1975 | Tharman . |
| 4,063,112 | 12/1977 | Dumbeck . |
| 4,123,009 | 10/1978 | Kilpinen . |
| 4,181,024 | 1/1980 | Leak et al. . |
| 4,465,367 | 8/1984 | Sabatier . |
| 4,524,620 | 6/1985 | Wright et al. . |
| 4,671,112 | 6/1987 | Kimura et al. .......................... 73/505 |
| 4,922,195 | 5/1990 | Cox . |
| 4,967,123 | 10/1990 | Lebsock . |
| 4,973,902 | 11/1990 | Dhyanchand et al. . |
| 4,978,909 | 12/1990 | Hendrix et al. . |
| 4,980,844 | 12/1990 | Demjanenko et al. .................. 73/660 |
| 5,109,700 | 5/1992 | Hicho ........................................ 73/660 |
| 5,187,434 | 2/1993 | Ando . |
| 5,195,046 | 3/1993 | Geradi et al. ............................ 73/579 |
| 5,203,188 | 4/1993 | Osgood et al. ......................... 364/576 |

*Primary Examiner*—Richard Chilcot
*Assistant Examiner*—Max Noori
*Attorney, Agent, or Firm*—E. A. Pennington; J. M. Spicer; H. W. Adams

[57] ABSTRACT

Operability of aircraft mechanical components is monitored by analyzing the voltage output of an electrical generator of the aircraft. Alternative generators, for a turbine-driven rotor aircraft, include the gas producer turbine tachometer generator, the power turbine tachometer generator, and the aircraft systems power producing starter/generator. Changes in the peak amplitudes of the fundamental frequency and its harmonics are correlated to changes in condition of the mechanical components.

28 Claims, 12 Drawing Sheets

10 5,483,833

METHOD AND APPARATUS FOR MONITORING AIRCRAFT COMPONENTS

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates generally to aircraft diagnostic and monitoring systems and, more specifically, to the use of voltage signals to characterize the condition of aircraft mechanical systems or components. The voltage signals are obtained from electric generators and/or ether electromagnetic devices such as tachometers that are already a part of the aircraft. Voltage signals are correlated to conditions of the aircraft systems, such as rotor imbalance and defective power train components. Once an incipient condition is detected, a warning can be provided to the pilot before serious damage or risk of life ensues.

BACKGROUND OF THE INVENTION

Aircraft, both fixed and rotary wing, utilize numerous rotating components whose dynamic and static balance is paramount to safe and efficient operation. Component rotating speeds range from very slow, in the low hundreds of RPM for helicopter main rotor blades (~300 RPM for the UH-1 helicopter), to tens of thousands RPM for gas turbine engines (~21,000 RPM). Between these extremes are RPM speeds for propellers, drive shafts, tail rotors, gear boxes, transmissions, power take-offs, environmental control units, hydraulic pumps, generators, clutches, sprague clutches, drive belts, tachometer generators, etc.

The proper balance of these components during normal design speeds is a characteristic that is essential for aviation operations. Aircraft are traditionally lightweight and thus, undesirable out-of-balance vibrations, and their harmonics, can cause serious structural damage and degrade flight performance.

Serious out-of-balance conditions of rotating components can lead to significant vibration which can, under certain circumstances, lead to catastrophic component and/or aircraft destruction in a relatively short period of time.

The aviation industry spends considerable resources to ensure that rotating components are in-balance and optimally functioning. Vibration analysis is traditionally used to check engine and power train components. Strobe light analysis and manual flag tracking techniques are used to check rotor and propeller balance.

Many of the rotating components are connected to electric producing devices, e.g., generators. For example, on gas turbine and piston-driven engines, most are connected to two tachometer generators plus a systems power starter/generator. One tachometer generator is connected to the gas producing turbine and the other tachometer generator to the power producing turbine.

The aircraft system's power producing starter/generator is connected to the drive shaft, gear box or power-take-off. Both tachometer generators and the aircraft power systems starter/generator emit electric signals proportional to the RPM of the component being turned.

A helicopter's rotor system is connected to a transmission via a mast assembly where the output RPM is read by a tachometer run by a tachometer generator connected to the transmission. It, too, emits an electric signal proportional to the RPM of the main rotor and the drive shaft connecting it to the transmission. The helicopter transmission has a power systems generator connected to it on an accessory gear box.

A known vibration detecting apparatus for a helicopter is described in U.S. Pat. No. 4,181,024 to Leak et al. This apparatus uses an accelerometer to sense vibration, and preferably requires placing multiple accelerometers at suitable locations throughout the aircraft. Each accelerometer is read individually by switching from one to the other.

U.S. Pat. No. 4,524,620 to Wright et al. describes an in-flight monitoring system which uses transducers as vibration sensors to monitor vibrations at individual rotor blades.

U.S. Pat. No. 4,465,367 to Sabatier describes a strobe light apparatus for detecting out-of-track distances of helicopter rotor blades. The pilot is required to aim a strobe light at the rotating blade tips from within the cockpit. This device is apparently not capable of measuring subtle degradations of machine components.

Because of the myriad moving components associated with the aircraft's various mechanical systems, both for fixed wing (airplane) or rotary wing (helicopter), and mutually interfering vibrational signals, traditional vibration analysis techniques may not be capable of detecting subtle, individual component conditions. Also, strobe systems are inherently limited in the type of conditions they measure. Thus, a continuing need exists for improved monitoring and diagnostic methods and devices.

SUMMARY OF THE INVENTION

An object of the present invention is to provide an apparatus and method for monitoring rotating aircraft components which utilizes existing electrical components as sensors of machine operating conditions.

Another object of the present invention is to provide an apparatus and method for monitoring rotating aircraft components which is light weight and relatively simple to install.

Yet another object of the present invention is to provide an apparatus and method for monitoring rotating aircraft components which requires little pilot input and thus minimizes pilot distraction during flight.

These and other objects of the invention are met by providing an apparatus for monitoring an aircraft mechanical system, which includes means for producing a voltage signal which varies in accordance with movement of at least one component of the mechanical system, the voltage signal exhibiting a fundamental peak amplitude and a plurality of harmonics thereof, and means for correlating changes in at least one of the fundamental peak amplitude and the harmonics to changes in condition of the at least one component.

Other objects, advantages and salient features of the invention will become apparent from the following detailed description, which taken in conjunction with the annexed drawings, discloses preferred embodiments of the invention.

DETAILED DESCRIPTION OF THE INVENTION

Figure 1:
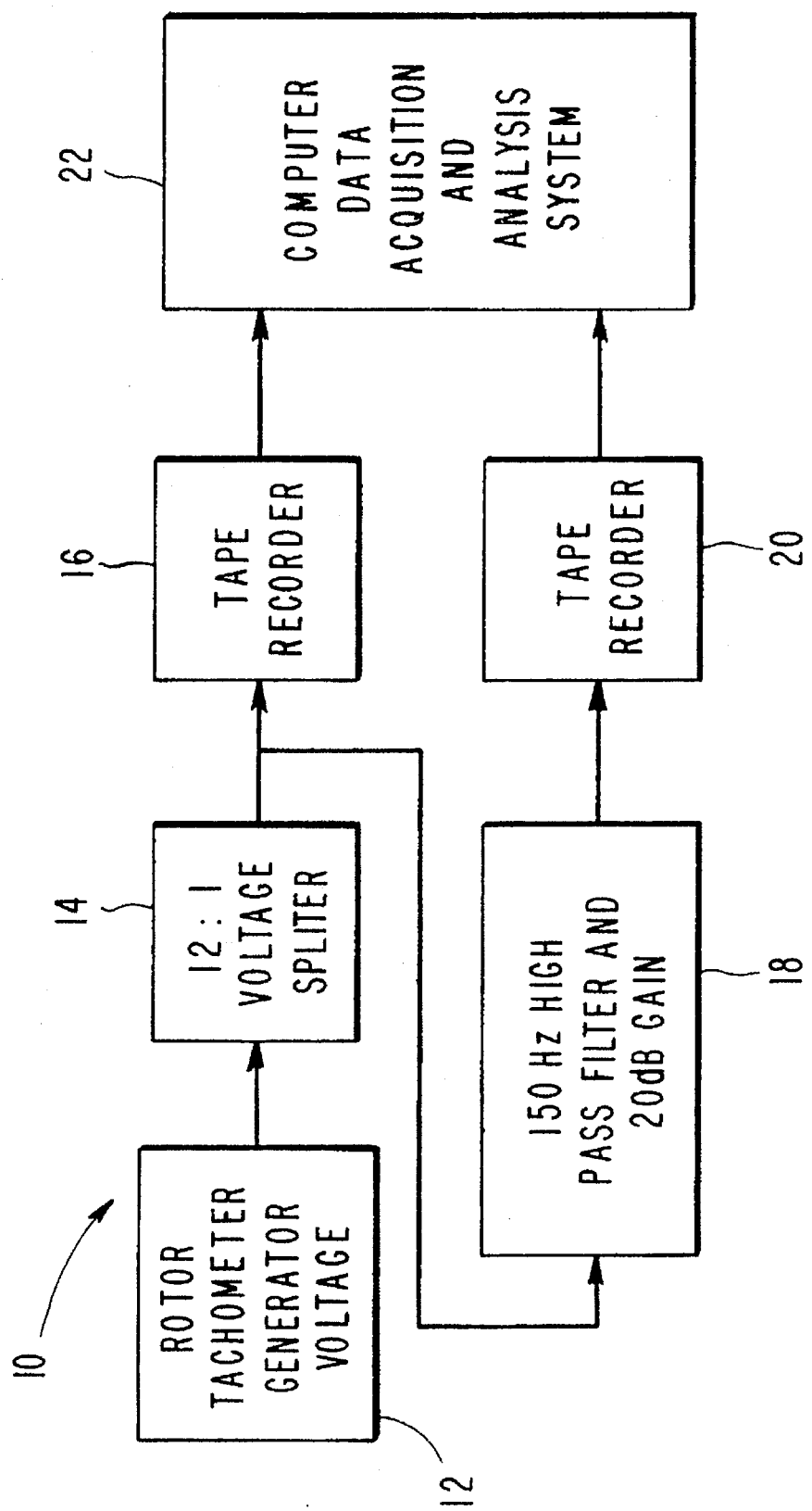
FIG. 1 is a schematic view of a first preferred embodiment of the present invention.

Referring to FIG. 1, an apparatus 10 for monitoring an aircraft component includes means 12 for producing a voltage signal which varies in accordance with movement of at least one component of a mechanical system of the aircraft. In one embodiment, the means 12 is a rotor tachometer generator.

The rotor tachometer generator 12 is a preexisting or stock item on most helicopters. Its function is to provide the pilot with an indication of rotor speed through either an analog or digital read-out in the cockpit.

The voltage signal may be taken from the rotor tachometer generator 12 by simply applying a lead to the voltage output of the generator 12. The signal carried by the lead is fed to a 12:1 voltage splitter 14, and may then be fed to a tape recorder 16 prior to being analyzed.

Once the user has determined the range of expected frequencies to be examined, filtering and amplifying means 18 can be employed to enhance the signal quality. The filtered and amplified signal can then be fed to a tape recorder 20.

A computer 22 is used to analyze the voltage signal, either in the attenuated-only form or in the attenuated, filtered and amplified form.

A demonstration of the present invention was made by testing for rotor imbalance in a two bladed Bell Jet Ranger. This aircraft uses an Allison turboshaft gas turbine engine, having a gas producer rotor speed of 50,970 rpm at normal cruise, a power turbine rotor speed of 33,290 rpm at normal cruise, and a power output shaft speed of 6,016 at normal cruise. The compressor and shaft RPM is indicated by the "N1" compressor tachometer generator.

The power turbine has an "N2" tachometer generator which provides an indication of the power turbine speed. Both the N1 and N2 tachometer generators produce voltage signals which can be analyzed according to the present invention.

The N1 gas producer turbine, the N2 power turbine, the engine drive shaft and all the accessory gear boxes attached to the engine and their driven components all turn at a different frequencies. By analyzing the different component spectra at the different frequencies produced by the applicable generators corresponding to the respective rotating component, a correlation can be made as to the operability of the different components. Thus, such conditions as rotor imbalance, and drive shaft/drive train degradation can be determined.

Figure 2:
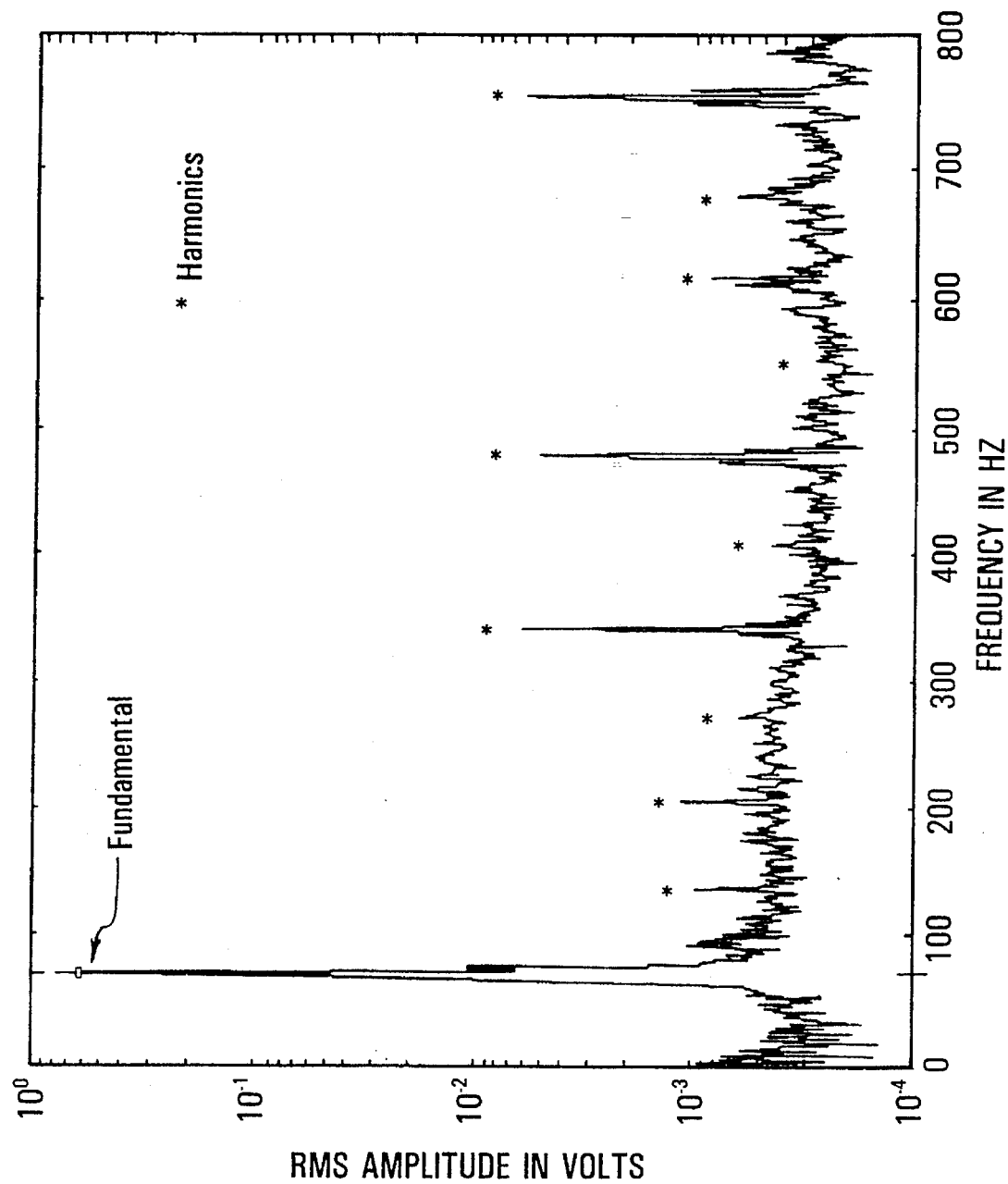
FIG. 2 is a spectrum of the rotor tachometer generator signal (attenuated-only version) based on operating the Bell test helicopter on the ground with no known rotor imbalances or other component degradations to establish a baseline signal.

FIG. 2 is a spectrum of the rotor tachometer generator signal (attenuated-only version) based on operating the Bell test helicopter on the ground with no known rotor imbalances or other component degradations to establish a baseline signal. The helicopter rotor was run at flat pitch conditions.

Figure 3:
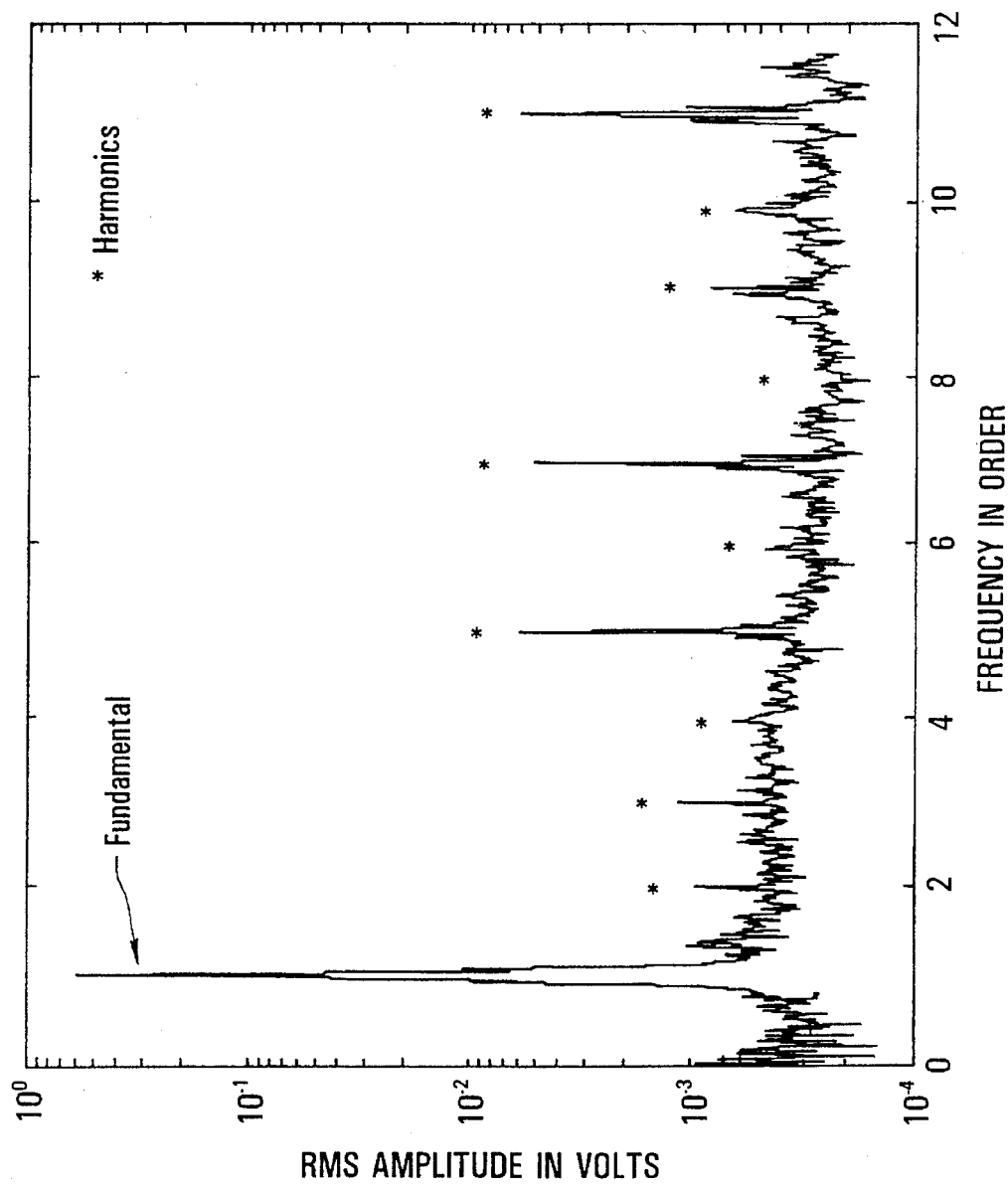
FIG. 3 is a normalized version of FIG. 2, in terms of order numbers.

The spectrum of FIG. 2 shows a fundamental peak at 68.51 Hz and at several multiples (or harmonics) of this frequency. FIG. 3 shows the same data, plotted on a relative frequency scale (orders of 68.51 Hz). In this plot, the frequency information has been "normalized (e.g., the fifth multiple of the fundamental shows up at order number "5"). It should be noted that the largest harmonic components are at the odd orders (3, 5, 7, 9, 11 . . . ). The full rotor tachometer generator signal will contain many more harmonic peaks than are shown in FIGS. 2 and 3.

Two additional test runs were made with a deliberately imposed rotor imbalance. In the first one, two wraps of masking tape (weighing 5.9 grams) were wrapped around the tip area of one of the two rotor blades. In the second test, one bolt and three nuts (weighing 11.6 grams) were secured to the tip area of one of the two rotor blades.

Initial analyses focused on trying to identify differences between the baseline run (with no unbalance) and the unbalanced runs. For the rotor tachometer generator, only slight differences in the peak amplitudes of the harmonic frequencies could be noticed.

The tachometer generator generally produces a voltage level that is proportional to the speed at which its shaft turns. Thus, the faster the helicopter rotor turns, the larger the tachometer generator output voltage becomes. The rotor tachometer generator in the tested helicopter is an AC generator (as are the N1 and N2 tachometer generators). Thus, the faster the helicopter rotor turns, the larger the voltage and frequency of the rotor tachometer generator becomes. A substantially linear relationship was observed by examining the relationship between signal frequency and voltage magnitude during coastdown of the helicopter.

This observation prompted a second, more careful analysis and comparison between the baseline rotor tachometer generator signals and the two unbalanced conditions. As noted previously, the tests were conducted at flat pitch conditions. Thus, the rotor speed should have remained constant during these runs. Detailed analyses pursuant to the present invention revealed a very slight variation in running speed. Vibration data obtained using an accelerometer (mounted on the transmission below the rotor) verified that the rotor speed varied up and then down slightly from baseline to moderate imbalance to heavy imbalance, respectively. This variation produced corresponding slight variations in the rotor tachometer generator voltage magnitudes that had distorted the initial analyses of the frequency peak amplitudes.

Figure 4:
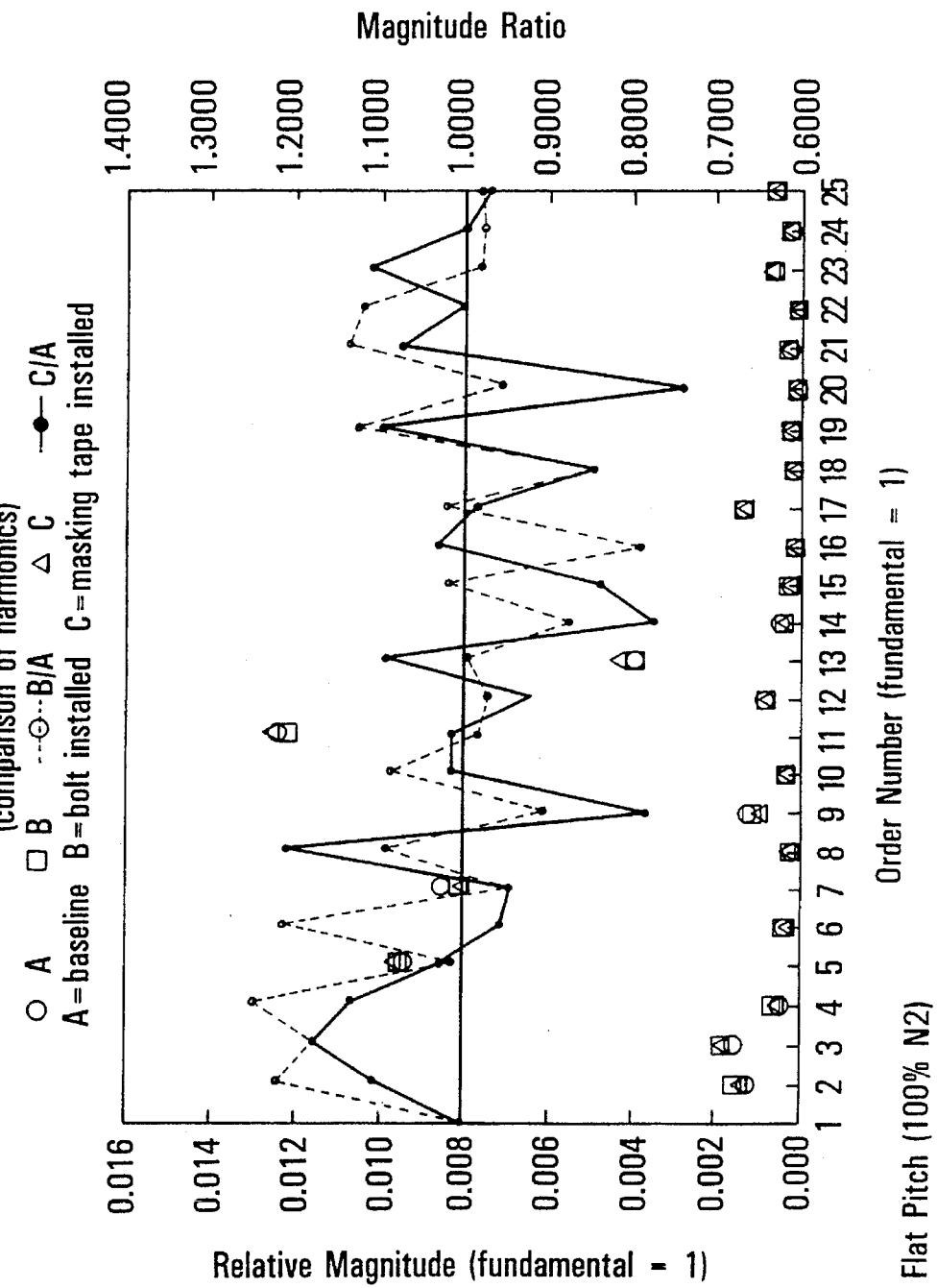
FIG. 4 is a chart of rotor tachometer generator harmonics and ratios to the fundamental frequency.

Rather than simply comparing the absolute magnitude of each fundamental and harmonic peak magnitude, the peak amplitudes were normalized by dividing their magnitude by the magnitude of the fundamental. Ratios were then computed between the normalized peak magnitudes obtained during the known unbalanced run conditions to their corresponding peak magnitudes acquired during the baseline run. These ratios and the normalized peak magnitudes for the three runs are shown in FIG. 4.

Figure 5:
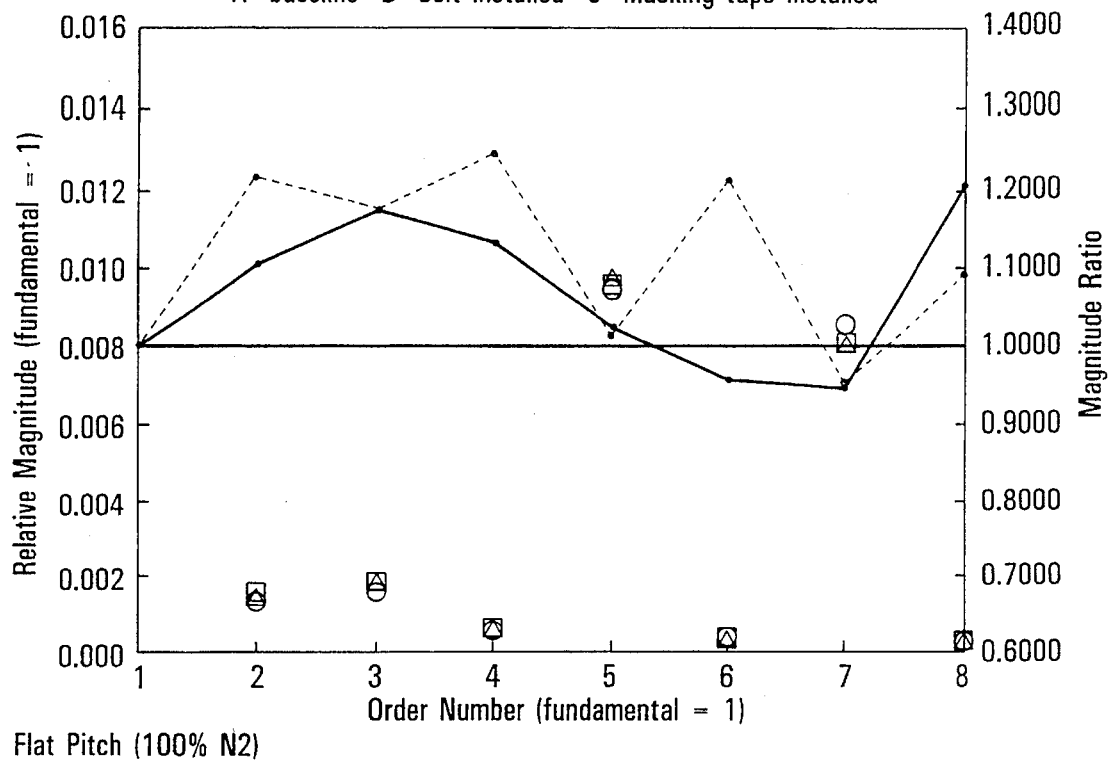
FIG. 5 is a graph showing a comparison of rotor tachometer generator harmonics and their ratios to the fundamental frequency.
Figure 6:
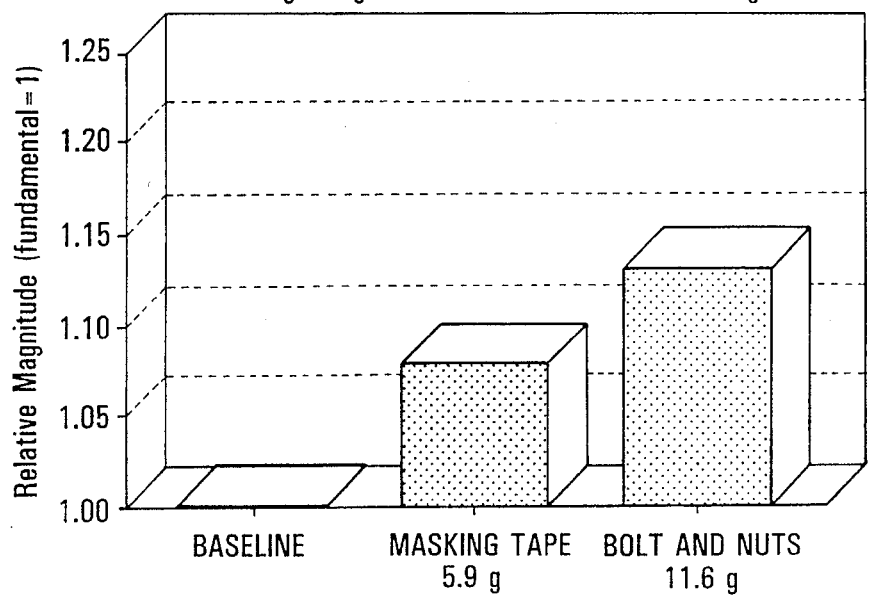
FIG. 6 is a graph of an average magnitude of harmonic ratios 2 through 8.

Of particular interest were the relative harmonic peak magnitudes for the first several harmonics (order numbers 2 through 8). FIG. 5 shows that these harmonics were seen to increase noticeably in the unbalanced rotor test data. An average was then computed for the harmonic ratios (2 through 8) and plotted in FIG. 6.

A strong correlation can be observed between average harmonic amplitudes and unbalanced conditions. The masking tape and bolt/nuts produced increases in harmonic magnitude, in approximate proportions to their added weights.

Figure 7:
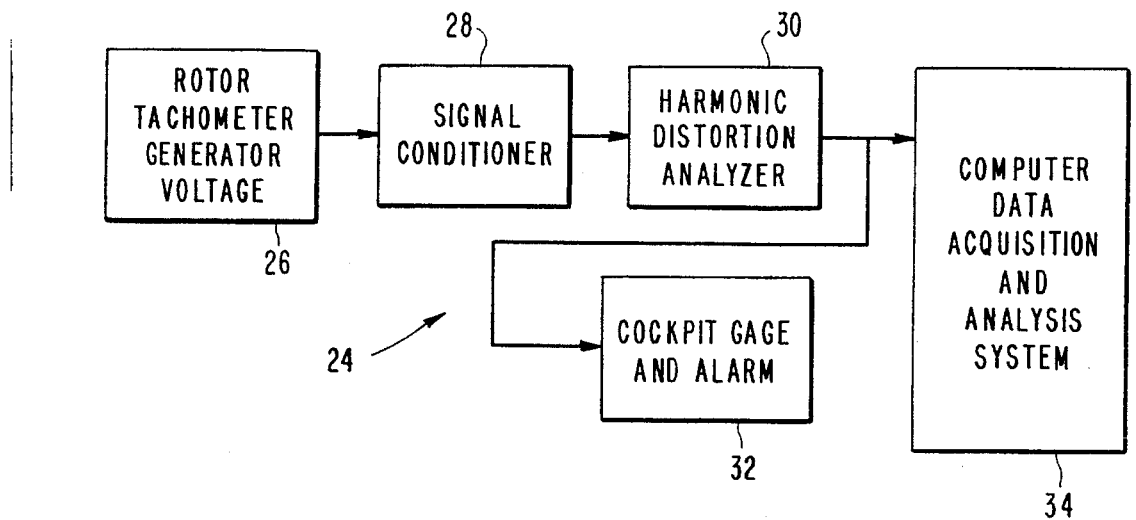
FIG. 7 is a schematic view of a second, preferred embodiment of the present invention.

An alternative embodiment of the present invention is illustrated in FIG. 7. The monitoring apparatus 24 measures harmonic distortion in the rotor tachometer generator 26 voltage signal. A signal conditioner 28 provides filtering and/or amplification of the voltage signal.

The conditioned signal is fed to a harmonic distortion analyzer 30, which could be any appropriate circuitry capable of continuously or periodically quantifying changes in the peak amplitudes of the fundamental frequency and its harmonics.

The relative harmonic content of the rotor tachometer generator signal is displayed in the cockpit with a gage and alarm 32 to provide the pilot with an indication of rotor imbalance or an indication of the overall rotor system condition. A computer 34 can be provided to undertake more detailed analyses of the signal, or to simply perform signal acquisition. Signal acquisition can be performed on the ground as a maintenance/pre-flight check-out procedure, or as an in-flight systems monitoring procedure.

Figure 8:
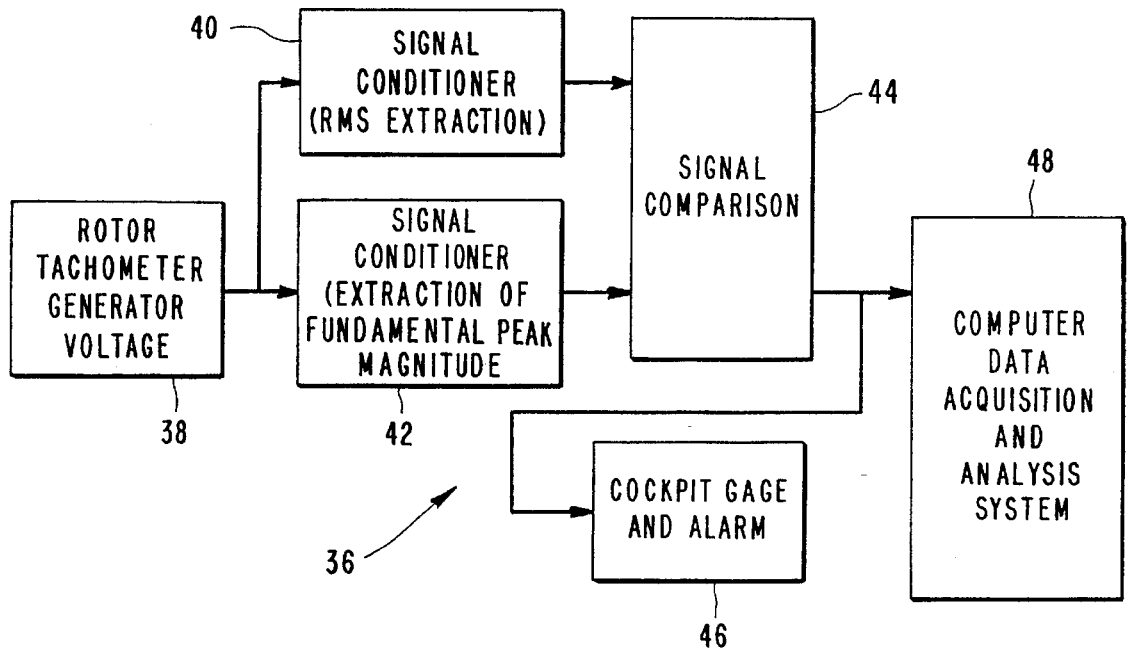
FIG. 8 is a schematic view of a third, preferred embodiment of the present invention.

FIG. 8 illustrates still another embodiment of the present invention, in which the apparatus 36 provides a correlation between rotor imbalance and the ratio of the total RMS level in the rotor tachometer generator 38 voltage signal to the magnitude of the fundamental peak. This is accomplished with a signal conditioner 40, which is constructed to function as a RMS extractor.

A second signal conditioner 42 is constructed to function as a fundamental peak magnitude detector. The respective outputs of the two signal conditioners 40 and 42 are compared by a signal comparison device 44, which then provides an output signal to a gage and alarm 46. A compute 48 can be provided for data storage and/or further analysis.

The foregoing analysis was conducted on a rotor tachometer generator, but could have been done with any generator, such as the 28 volt dc generator. Tests were undertaken using this generator, which serves as the starter/generator, by ac coupling its voltage output to an analyzer and DAT tape recorder, thus acquiring only the ac signal that was superimposed on the dc voltage output.

The spectrum from the dc generator was found to contain many peaks of harmonically related and non-harmonic peaks. The following methods were employed to determine the nature and usefulness of these peaks:

(1) high pass filtering, amplification, fast RMS-to-dc conversion (demodulation), with a fast Fourier transform (FFT) performed on the resulting waveform;

(2) FFT on the raw generator voltage waveform, performed primarily to look at the overall spectral content of the data; and (3) FFT on the raw waveform with digital manipulation of the spectral data to enhance specific mechanical frequencies of interest (such as gear tooth meshing peaks).

Using the first method, certain dominant peaks in the spectrum showed growth in amplitude relative to an implanted rotor imbalance increase. Three rotor balance conditions were used, baseline (no imbalance), several wraps of tape around one blade tip (moderate imbalance), and one quarter inch bolt on the blade tip (heavy imbalance).

Figure 9:
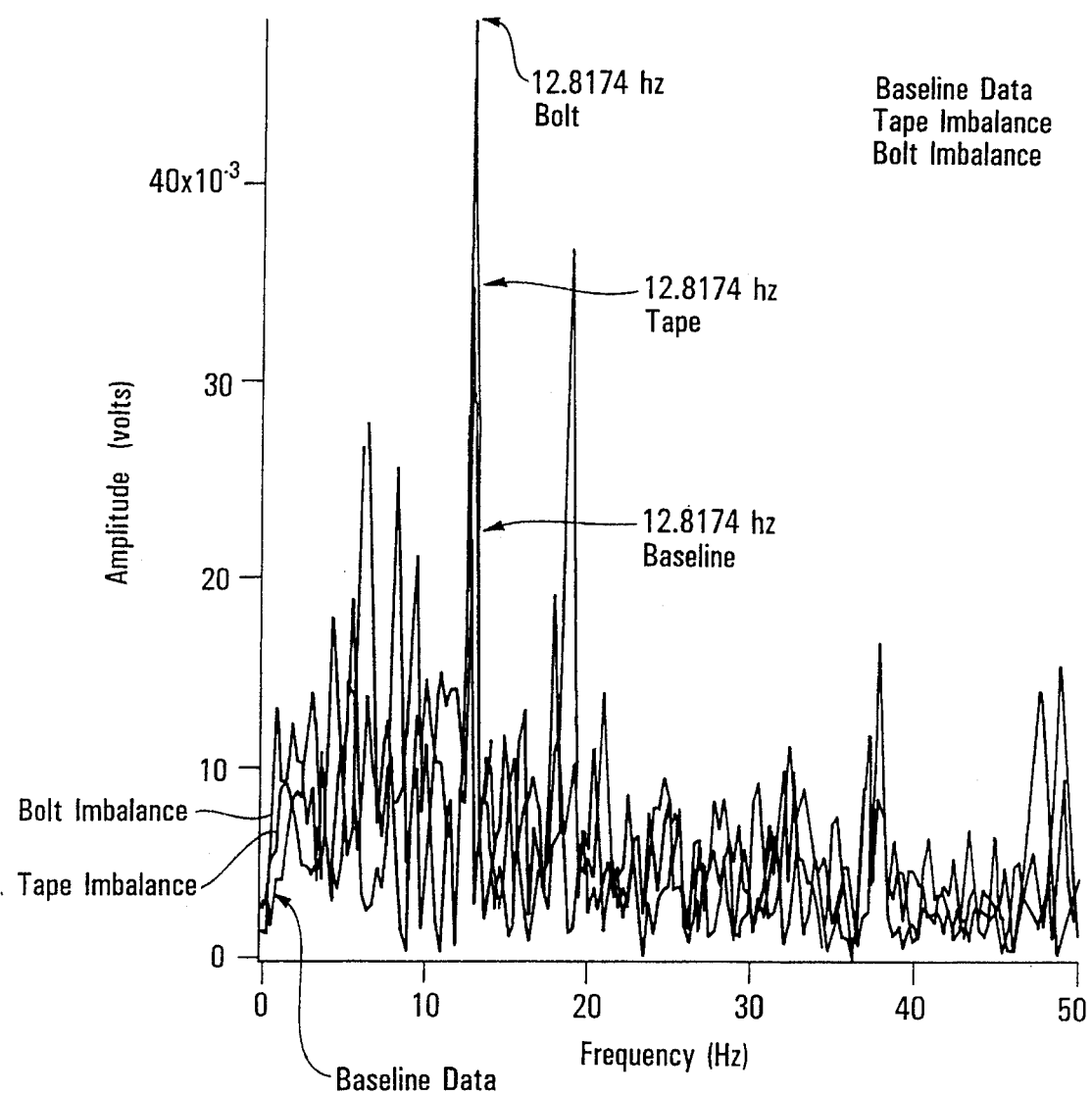
FIGS. 9 and 10 are graphs showing starter generator data, high pass filtered at 9 kHz, amplified ×100, RMS to dc converted, for baseline, moderate imbalance, and heavier imbalance.
Figure 10:
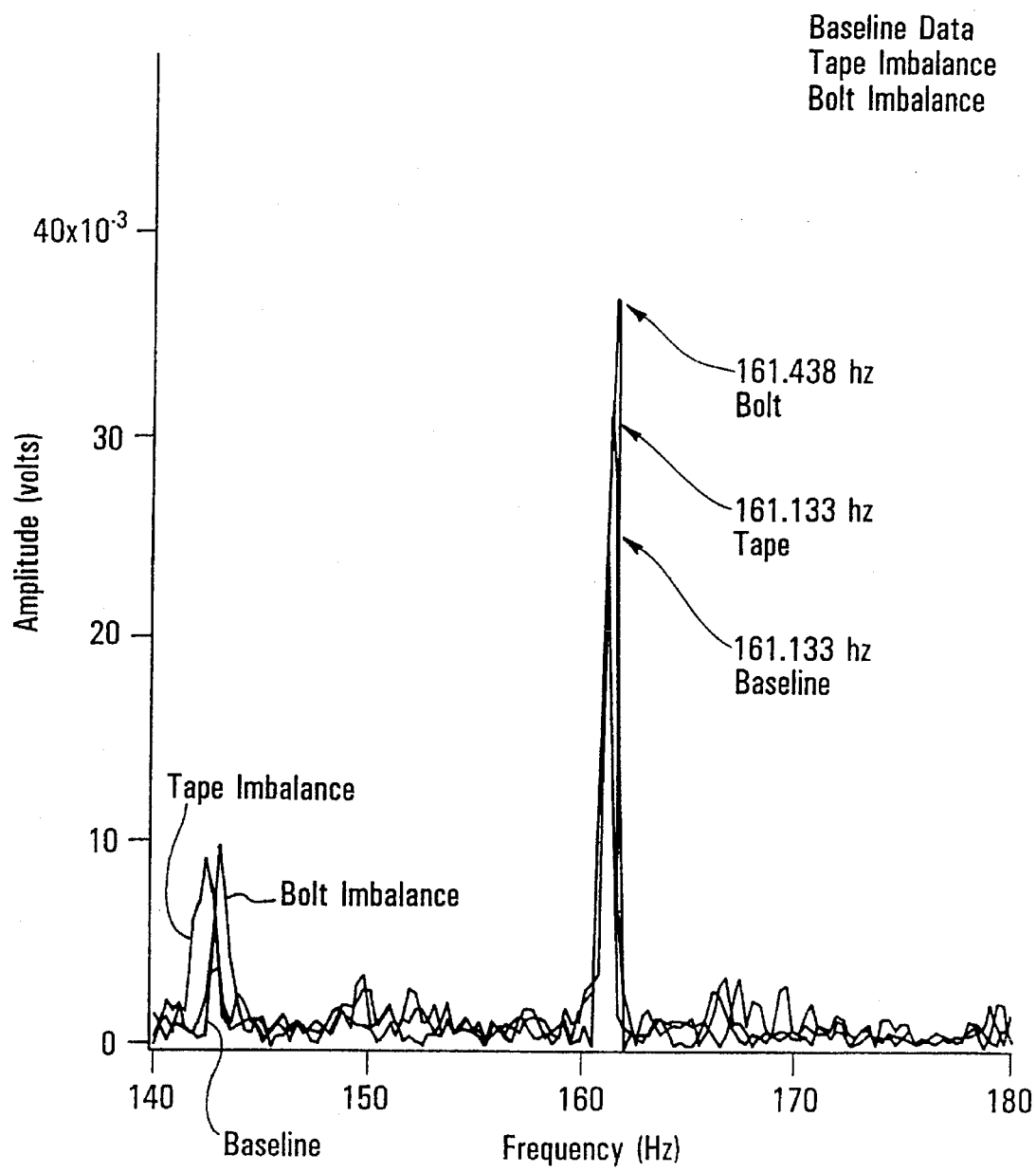

FIGS. 9 and 10 show the conspicuous trend of the peaks in the upward direction as imbalance is increased, at the 12.82 Hz fundamental and the 161.7 Hz harmonic, respectively. It should also be noted that the blade pass frequency peak amplitude grew with imbalance. This result is similar to those discussed above with respect to the other tests conducted on the rotor tachometer generator. The embodiment of FIG. 7 could be used to manipulate the data shown in FIGS. 9 and 10.

Figure 11:
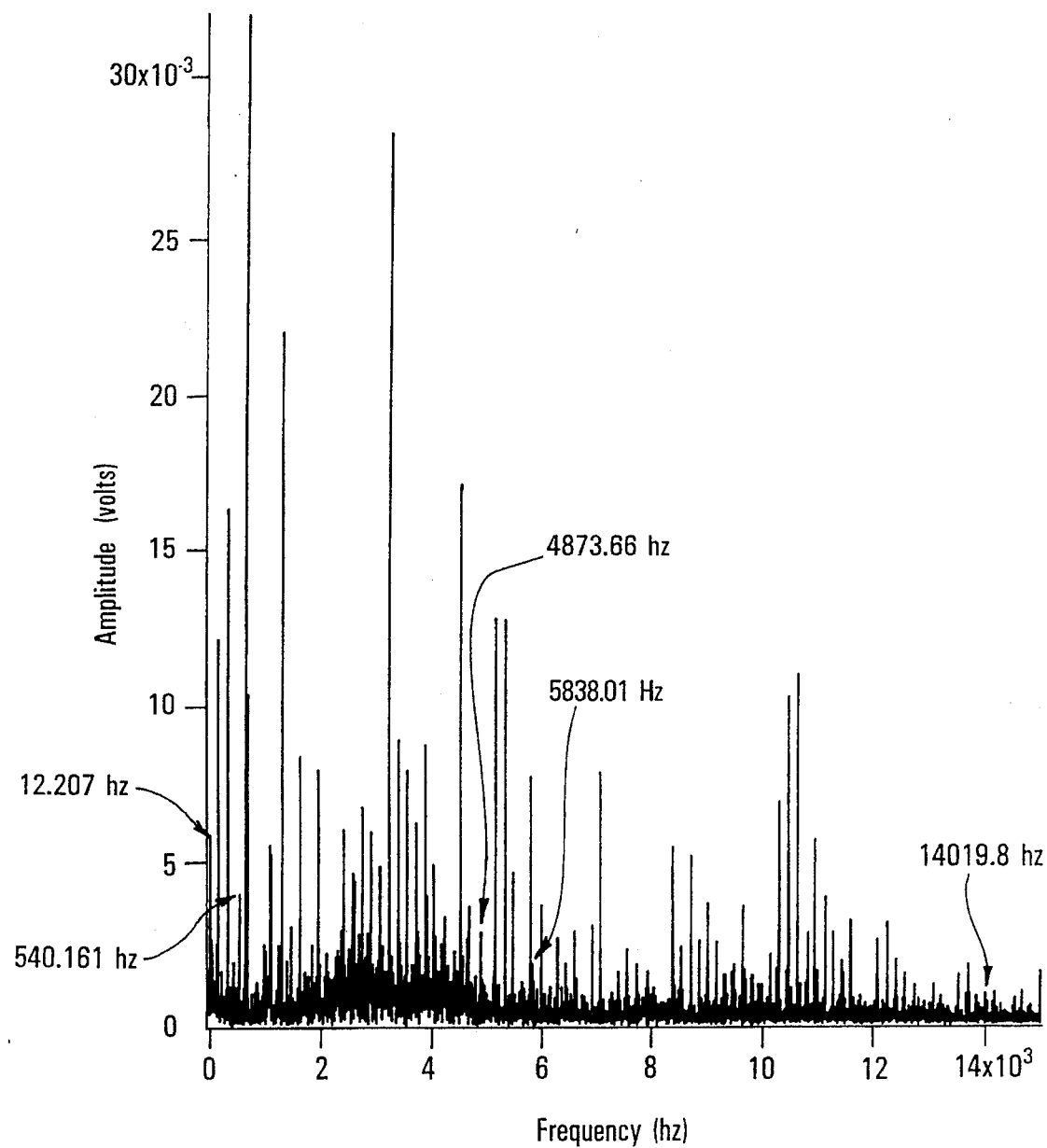
FIG. 11 is an FFT raw voltage waveform taken from the dc starter/generator of a Bell 206 helicopter.

Method "2" described above was used to look at the overall spectral content of the raw waveform, and look for any useful peaks related to mechanical events. It was found that the spectrum was dominated by 644.0 Hz and harmonics thereof, with several 161.7 Hz sideband peaks (as well as others) around that peak. A spectrum of the raw data is shown in FIG. 11.

Method "3" described above is a digital mathematical method to shift peaks of interest to their proper place in the spectrum. Mechanical anomalies modulate the generator voltage output by varying the generator's instantaneous speed, and these anomaly frequencies appear as sidebands of the "carrier" frequency in the generator voltage. The digital method described here takes the digitized spectral data from the raw waveform and separately adds and subtracts the "carrier" frequency from the raw data. The resulting modified FFT spectrum can be searched for mechanical anomaly peaks at their calculated locations.

Figure 12:
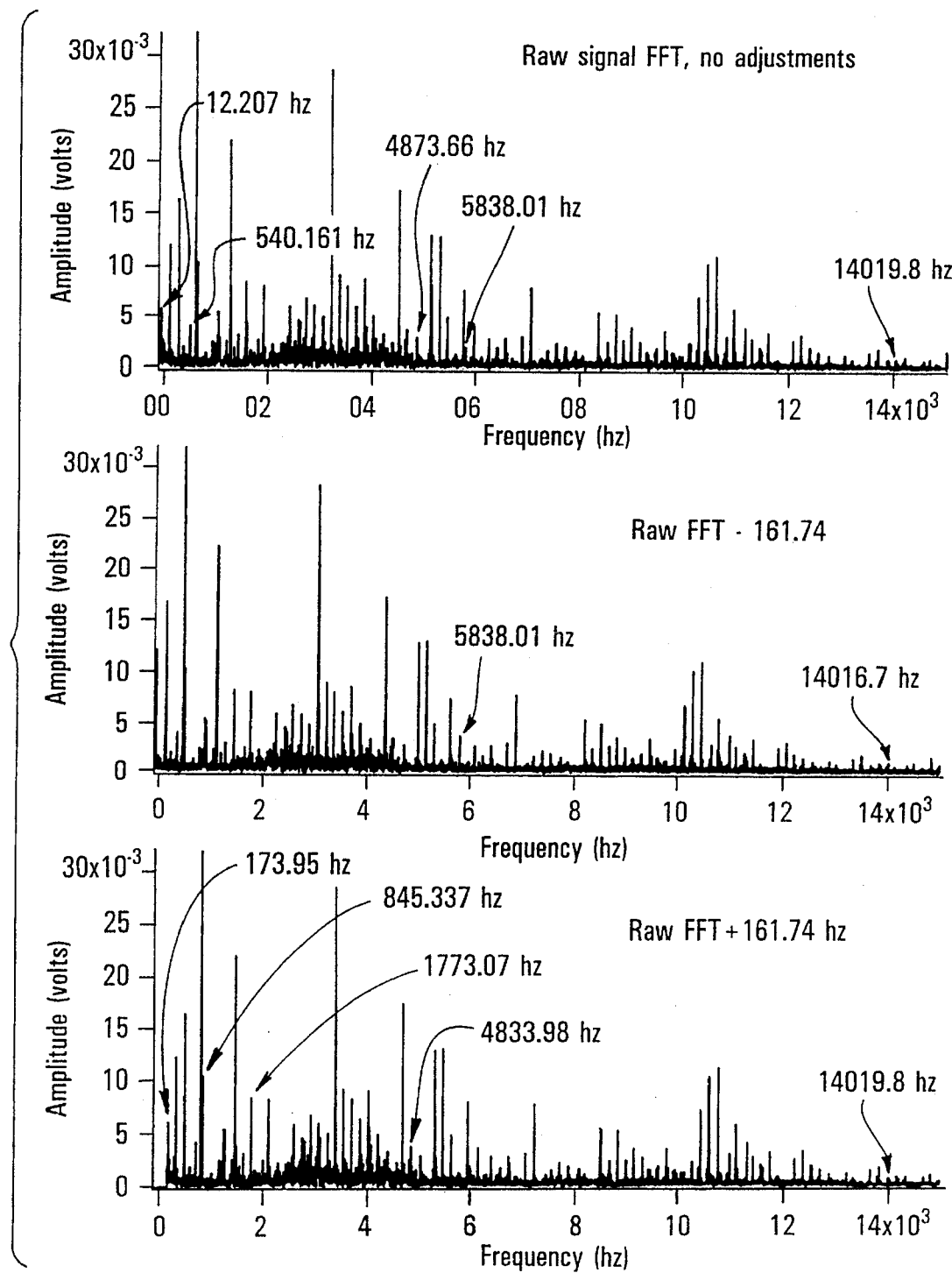
FIG. 12 is a composite of three graphs showing dc generator signals as a raw FFT spectrum, a negative-adjusted FFT (minus 161.74 Hz) and a positive-adjusted FFT (plus 161.74 Hz), respectively.

This method was performed using 161.7 Hz and 644.0 Hz as the "carriers", both of which appear as dominant peaks in the raw voltage signal spectrum. The 161.7 Hz digital shifting technique, shown in FIG. 12, shows several significant size peaks corresponding with calculated mechanical peaks of interest. The marked peaks show known gear speeds and gear tooth meshing frequencies.

Figure 13:
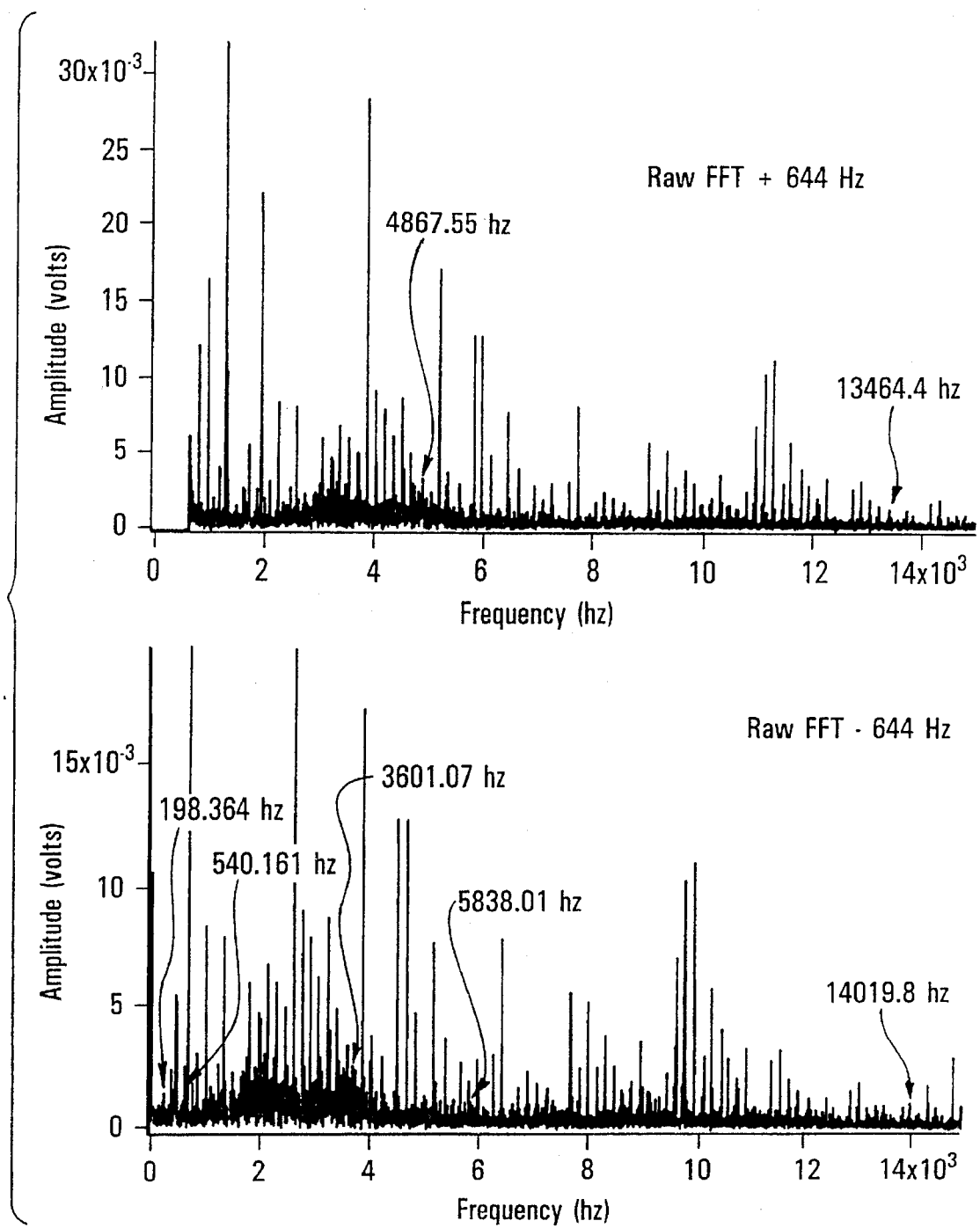
FIG. 13 is a composite of two graphs showing dc generator signals as a positive-adjusted (plus 644.0 Hz) FFT spectrum, and a negative-adjusted FFT (minus 644.0 Hz), respectively.

FIG. 13, using the 644 Hz addition/subtraction, shows some calculated peaks most of which are not significant in size and are close to the noise floor. These tests did not include any deliberately installed imbalances or drive train flaws. These methods can be used to correlate changes in amplitude with degradation of the mechanical components associated with certain peaks.

The ac coupled dc generator voltage signal, properly conditioned, contains valuable information regarding the condition of the helicopter engine mechanical components. Balance condition of the rotor was trended successfully using method "1" above, and peaks relating to several mechanical events were detected using method "3".

Figure 14:
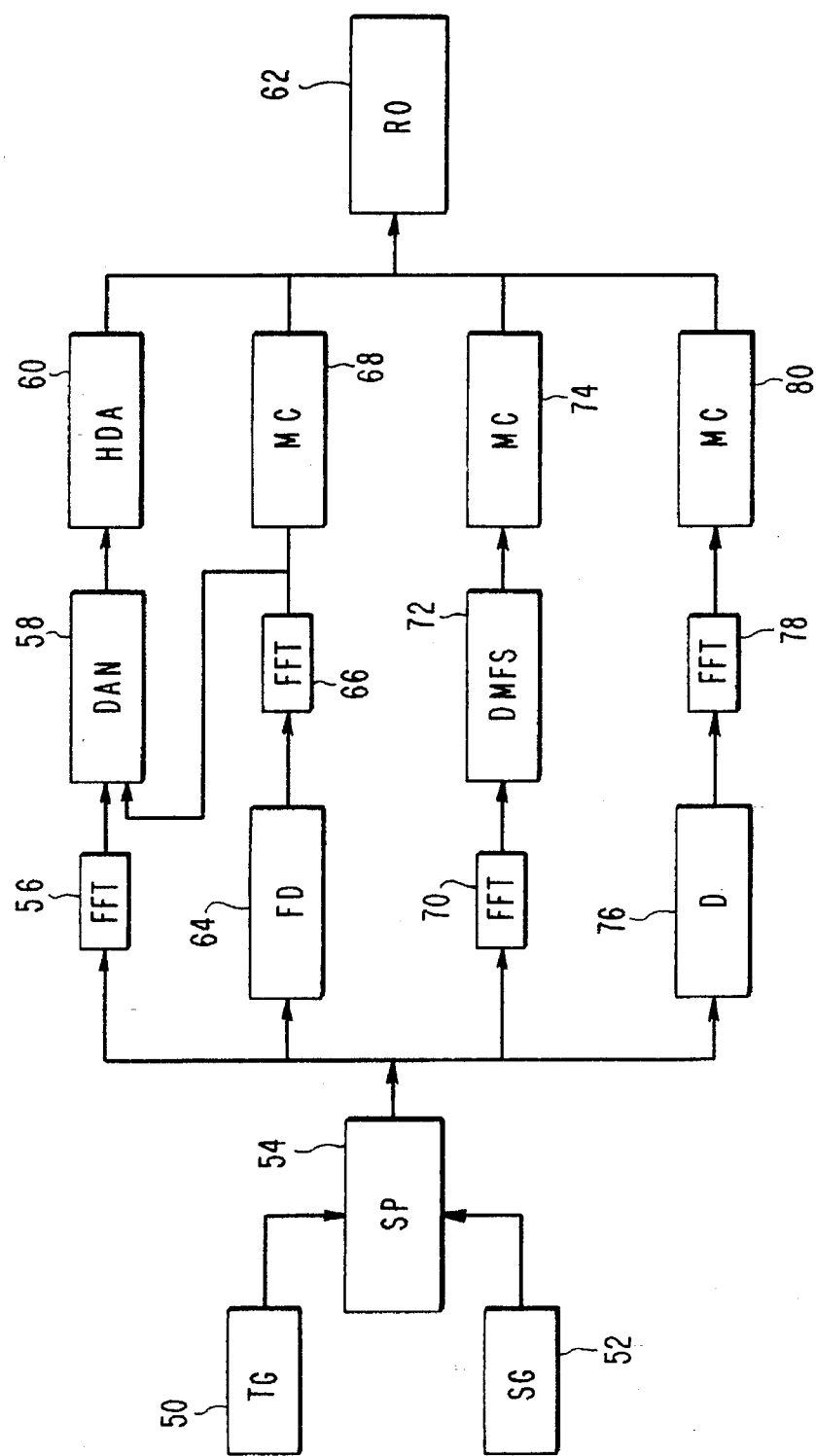
FIG. 14 is a schematic block diagram illustrating different embodiments of the present invention.

FIG. 14 is a schematic block diagram illustrating the different embodiments of the present invention. Either of the tachometer generator (TG) 50 and the starter/generator (SG) 52 outputs a voltage signal to a signal preconditioning (SP) device 54. This device can be designed according to the specific embodiments employed. For example, if the signal is from SG 52, which is typically 24 Vdc, device 54 may be ac coupled.

After signal preconditioning, the voltage signal may be analyzed according to the first-described embodiment, whereby the voltage signal is digitized and a FFT 56 is performed on the digitized signal. Digital data normalization (DAN) 58 is then performed on the FFT, and harmonic distortion analysis (HDA) 60 results in a signal indicative of machine condition, which signal can be output to a suitable readout device (RO) 62.

In the second embodiment, the voltage signal is high pass filtered and RMS-DC demodulated in a filter/demodulator (FD) 64. The frequency response of the filter is selected to remove major frequency components. A 9 kHz frequency response was selected in testing the invention since this was above running speed and other major components.

The output of FD 64 is digitized and a FFT 66 is performed. The FFT data is then evaluated according to specific peaks, such as by a memory/comparator (MC) device 68. Device 68, for example, can store baseline specific peak data, correlating to specific components in the drive train. Data derived from the TG 50 or the SG 52 is compared to the baseline data, and significant differences (as error signals, for example) are correlated to machine condition signals. The condition signals are then output to the RO 62.

A third embodiment entails taking the output of FFT 66 and performing a digital data normalization and harmonic distortion analysis with devices 58 and 60.

A fourth embodiment takes the output of SP 54 and feeds it to a FFT device 70 (without filtering and demodulating, as in the second embodiment). The FFT signal is then subjected to digital mathematical frequency shifting (DMFS) by device 72. After this, the signal is evaluated for specific peaks compared to baseline peaks with memory/comparator (MC) device 74, whereupon the output is delivered to RO 62.

A fifth embodiment involves outputting the signal from SP 54 to a RMS-to-DC demodulator (D) 76. The demodulated signal is then output to a FFT device 78, and specific peak evaluation is performed by a memory/comparator (MC) device 80.

Substantially every component of the block diagram in FIG. 14 to the right of the SP 54 can be performed through a standard data acquisition card and a high speed personal computer running commercially available software which generates the FFT, for example. Such a program is LAB-VIEW, available from National Instruments Corporation of Austin, Tex. It is understood that many of the standard data acquisition cards will include analog-to-digital converters to digitize the signal prior to performing the FFT. Of course, analog circuits can be employed to perform certain functions, such as the RMS-to-DC demodulation.

While advantageous embodiments have been chosen to illustrate the invention, it will be understood by those skilled in the art that various changes and modifications can be made therein without departing from the scope of the invention as defined in the appended claims. For example, digitally-manipulated data may likewise by analog-manipulated, where appropriate. Moreover, alternative methods of data analysis may include demodulation, as well as other methods.

What is claimed is:

1. An apparatus for monitoring an aircraft having a mechanical system and an electrical system, comprising:

means for obtaining an electrical signal from a component of the electrical system, the electrical signal varying in accordance with movement of at least one component of the mechanical system; and means for correlating changes in the electrical signal to changes in condition of the at least one component, wherein the electrical signal is a voltage signal, and wherein the means for producing the voltage signal comprises at least one of a gas producer turbine tachometer generator, a power turbine tachometer generator, a rotor tachometer generator, and an aircraft systems power producing starter/generator.

2. An apparatus according to claim 1, wherein the electrical signal is a voltage signal and wherein the correlating means includes means for producing a frequency-domain spectrum of the voltage signal during operation of the aircraft, the voltage signal exhibiting a fundamental frequency having a peak amplitude, and a plurality of harmonics, each having a peak amplitude.

3. An apparatus according to claim 2, wherein the correlating means includes means for determining a baseline fundamental frequency having a corresponding peak amplitude, means for monitoring the fundamental frequency and its corresponding peak amplitude during operation of the aircraft, and means for comparing the monitored peak amplitude to the baseline peak amplitude.

4. An apparatus according to claim 3, wherein the means for producing a voltage signal comprises an aircraft systems power producing starter/generator.

5. An apparatus according to claim 2, wherein the correlating means includes means for determining changes in the peak amplitudes of the harmonic frequencies relative to changes in the peak amplitude of the fundamental frequency.

6. An apparatus according to claim 2, wherein the correlating means includes means for determining changes in relative harmonic peak magnitude for at least the first several harmonics.

7. An apparatus according to claim 5, wherein the correlating means includes means for determining a baseline fundamental frequency having a corresponding peak amplitude, and baseline harmonics, each having a corresponding peak amplitude, means for monitoring, during operation of the aircraft, the fundamental frequency and its corresponding peak amplitude, and the harmonics, each having a corresponding peak amplitude, means for normalizing the monitored and baseline fundamental and harmonic peak amplitudes, and means for determining a ratio of the baseline normalized fundamental and harmonic peak amplitudes to the monitored normalized fundamental and harmonic peak amplitudes.

8. An apparatus according to claim 7, further comprising means for determining an average change in relative harmonic peak magnitudes for at least the first several harmonics.

9. An apparatus according to claim 1, wherein the correlating means comprises a computer.

10. An apparatus according to claim 8, further comprising a voltage splitter disposed between the computer and the means for producing a voltage signal.

11. An apparatus according to claim 1, wherein the electrical signal is a voltage signal, and wherein the apparatus further comprises signal conditioning means, disposed between the means for obtaining the voltage signal and the correlating means.

12. An apparatus according to claim 11, wherein the signal conditioning means comprises a high pass filter and an amplifier.

13. An apparatus according to claim 1, wherein the electrical signal is a voltage signal, and wherein the correlating means includes means for filtering the voltage signal, means for RMS-to-DC demodulating the filtered voltage signal, means for performing a fast Fourier transform (FFT) on the demodulated voltage signal, and means for comparing baseline specific frequency peaks to frequency peaks from the FFT.

14. An apparatus according to claim 1, wherein the electrical signal is a voltage signal, and wherein the correlating means includes means for performing a fast Fourier transform (FFT) on the voltage signal, means for performing digital mathematical frequency shifting on the FFT, and means for comparing baseline specific frequency peaks to frequency peaks from the mathematically frequency shifted FFT.

15. An apparatus according to claim 1, wherein the electrical signal is a voltage signal and wherein the correlating means includes means for RMS-to-DC demodulating the voltage signal, means for performing a fast Fourier transform (FFT) on the demodulated voltage signal, and means for comparing baseline specific frequency peaks to frequency peaks from the FFT.

16. A method for monitoring an aircraft having a mechanical system and an electrical system, comprising the steps of:

obtaining an electrical signal from a component of the electrical system, the electrical signal varying in accordance with movement of at least one component of the mechanical system; and correlating changes in the electrical signal to changes in condition of the at least one component, wherein the electrical signal is a voltage signal and wherein the correlating step includes producing a frequency-domain spectrum of the voltage signal during operation of the aircraft, the voltage signal exhibiting a fundamental frequency having a peak amplitude, and a plurality of harmonics, each having a peak amplitude, and wherein the correlating step further includes determining a baseline fundamental frequency having a corresponding peak amplitude, monitoring the fundamental frequency and its corresponding peak amplitude during operation of the aircraft, and comparing the monitored peak amplitude to the baseline peak amplitude.

17. A method according to claim 16, wherein the step of producing a voltage signal comprises attaching a lead to an aircraft systems power producing starter/generator.

18. A method according to claim 16, wherein the correlating step includes determining changes in the peak amplitudes of the harmonic frequencies relative to changes in the peak amplitude of the fundamental frequency.

19. A method according to claim 16, wherein the correlating step includes determining changes in relative harmonic peak magnitude for at least the first several harmonics.

20. A method according to claim 19, wherein the correlating step includes determining a baseline fundamental frequency having a corresponding peak amplitude, and baseline harmonics, each having a corresponding peak amplitude, monitoring, during operation of the aircraft, the fundamental frequency and its corresponding peak amplitude, and the harmonics, each having a corresponding peak amplitude, normalizing the monitored and baseline fundamental and harmonic peak amplitudes, and determining a ratio of the baseline normalized fundamental and harmonic peak amplitudes to the monitored normalized fundamental and harmonic peak amplitudes.

21. A method for monitoring an aircraft mechanical system, comprising the steps of:

producing a voltage signal which varies in accordance with movement of at least one component of the mechanical system; and correlating changes in the voltage signal to changes in condition of the at least one component, wherein the step of producing a voltage signal comprises attaching a lead to at least one of a gas producer turbine tachometer generator, a power turbine tachometer generator, a rotor tachometer generator, and an aircraft systems power producing starter/generator.

22. An apparatus for monitoring an aircraft having a mechanical system and an electrical system, comprising:

means for obtaining an electrical signal from a component of the electrical system, the electrical signal varying in accordance with movement of at least one component of the mechanical system; and means for correlating changes in the electrical signal to changes in condition of the at least one component, wherein the correlating means includes means for producing a frequency-domain spectrum of a voltage signal during operation of the aircraft, the voltage signal exhibiting a fundamental frequency having a peak amplitude, and a plurality of harmonics, each having a peak amplitude, and wherein the correlating means includes means for determining a baseline fundamental frequency having a corresponding peak amplitude, means for monitoring the fundamental frequency and its corresponding peak amplitude during operation of the aircraft, and means for comparing the monitored peak amplitude to the baseline peak amplitude.

23. An apparatus for monitoring an aircraft having a mechanical system and an electrical system, comprising:

means for obtaining an electrical signal from a component of the electrical system, the electrical signal varying in accordance with movement of at least one component of the mechanical system; and means for correlating changes in the electrical signal to changes in condition of the at least one component, wherein the correlating means includes means for producing a frequency-domain spectrum of voltage signal during operation of the aircraft, the voltage signal exhibiting a fundamental frequency having a peak amplitude, and a plurality of harmonics, each having a peak amplitude, and wherein the correlating means includes means for determining changes in the peak amplitudes of the harmonic frequencies relative to changes in the peak amplitude of the fundamental frequency.

24. An apparatus for monitoring an aircraft having a mechanical system and an electrical system, comprising:

means for obtaining an electrical signal from a component of the electrical system, the electrical signal varying in accordance with movement of at least one component of the mechanical system; and means for correlating changes in the electrical signal to changes in condition of the at least one component, wherein the correlating means includes means for producing a frequency-domain spectrum of a voltage signal during operation of the aircraft, the voltage signal exhibiting a fundamental frequency having a peak amplitude, and a plurality of harmonics, each having a peak amplitude, and wherein the correlating means includes means for determining changes in relative harmonic peak magnitude for at least the first several harmonics.

25. An apparatus for monitoring an aircraft having a mechanical system and an electrical system, comprising:

means for obtaining an electrical signal from a component of the electrical system, the electrical signal varying in accordance with movement of at least one component of the mechanical system;

means for correlating changes in the electrical signal to changes in condition of the at least one component, wherein the electrical signal is a voltage signal; and signal conditioning means disposed between the means for obtaining a voltage signal and the correlating means.

26. An apparatus for monitoring an aircraft having a mechanical system and an electrical system, comprising;

means for obtaining an electrical signal from a component of the electrical system, the electrical signal varying in accordance with movement of at least one component of the mechanical system;

means for correlating changes in the electrical signal to changes in condition of the at least one component, wherein the electrical signal is a voltage signal, and wherein the correlating means includes means for filtering the voltage signal, means for RMS-to-DC demodulating the filtered voltage signal, means for performing a fast Fourier transform (FFT) on the demodulated voltage signa, and means for comparing baseline specific frequency peaks to frequency peaks from the FFT.

27. An apparatus for monitoring an aircraft having a mechanical system and an electrical system, comprising;

means for obtaining an electrical signal from a component of the electrical system, the electrical signal varying in accordance with movement of at least one component of the mechanical system;

means for correlating changes in the electrical signal to changes in condition of the at least one component, wherein the electrical signal is a voltage signal, and wherein the correlating means includes means for performing a fast Fourier transform (FFT) on the voltage signal, means for performing digital mathematical frequency shifting on the FFT, and means for comparing baseline specific frequency peaks to frequency peaks from the mathematically frequency shifted FFT.

28. An apparatus for monitoring an aircraft having a mechanical system and an electrical system, comprising:

means for obtaining an electrical signal from a component of the electrical system, the electrical signal varying in accordance with movement of at least one component of the mechanical system;

means for correlating changes in the electrical signal to changes in condition of the at least one component, wherein the electrical signal is a voltage signal, and wherein the correlating means includes means for RMS-to-DC demodulating the voltage signal, means for performing a fast Fourier transform (FFT) on the demodulated voltage signal, and means for comparing baseline specific frequency peaks to frequency peaks from the FFT.

* * * * *